(12) United States Patent
Watanabe et al.

(10) Patent No.: US 9,333,766 B2
(45) Date of Patent: May 10, 2016

(54) OPTICAL SCANNER WITH HOUSING TO SUPPORT LIGHT SOURCES AND IMAGE FORMING APPARATUS INCORPORATING SAME

(71) Applicants: Kazunori Watanabe, Tokyo (JP); Keiichi Serizawa, Kanagawa (JP); Hiroshi Johno, Kanagawa (JP); Shuji Takamatsu, Kanagawa (JP)

(72) Inventors: Kazunori Watanabe, Tokyo (JP); Keiichi Serizawa, Kanagawa (JP); Hiroshi Johno, Kanagawa (JP); Shuji Takamatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 14/071,036

(22) Filed: Nov. 4, 2013

(65) Prior Publication Data
US 2014/0146332 A1    May 29, 2014

(30) Foreign Application Priority Data

Nov. 27, 2012 (JP) ................................. 2012-258686
May 15, 2013 (JP) ................................. 2013-103151

(51) Int. Cl.
*H04N 1/028* (2006.01)
*H04N 1/00* (2006.01)
*B41J 2/47* (2006.01)
*G02B 26/12* (2006.01)

(52) U.S. Cl.
CPC ............... *B41J 2/473* (2013.01); *G02B 26/123* (2013.01)

(58) Field of Classification Search
None
See application file for complete search history.

(56) References Cited

U.S. PATENT DOCUMENTS

2009/0295899 A1*  12/2009  Watanabe et al. ............. 347/129
2012/0182735 A1*  7/2012  Takamatsu et al. ........ 362/249.1

FOREIGN PATENT DOCUMENTS

| JP | 10-003047 | 1/1998 |
|----|-----------|--------|
| JP | 2000-098278 | 4/2000 |
| JP | 2009-294238 | 12/2009 |

* cited by examiner

*Primary Examiner* — Thomas D Lee
(74) *Attorney, Agent, or Firm* — Harness, Dickey & Pierce, P.L.C.

(57) ABSTRACT

An optical scanner, which is included in an image forming apparatus, includes a light source including a recessed portion provided on an outer circumference thereof, and a housing configured to support the light source. The housing includes a positioning unit configured to position the light source in a vertical optical axis of the light source, and a cutout provided on an inner circumference of the positioning unit. The light source is positioned to the positioning unit with the recessed portion being disposed at the cutout and then is fixed to the housing. The image forming apparatus includes an image carrier configured to form an image on a surface thereof, and the above-described optical scanner.

18 Claims, 12 Drawing Sheets

OPTICAL SCANNER WITH HOUSING TO SUPPORT LIGHT SOURCES AND IMAGE FORMING APPARATUS INCORPORATING SAME

CROSS-REFERENCE TO RELATED APPLICATIONS

This patent application is based on and claims priority pursuant to 35 U.S.C. §119 to Japanese Patent Application Nos. 2012-258686, filed on Nov. 27, 2012 and 2013-103151, filed on May 15, 2013 in the Japan Patent Office, the entire disclosures of which are hereby incorporated by reference herein.

BACKGROUND

1. Technical Field

Embodiments of the present invention relate to an optical scanner including a laser diode array, and an image forming apparatus incorporating the optical scanner.

2. Related Art

Due to a recent trend of high productivity and high density in image forming apparatuses, optical scanners provided thereto have achieved high productivity and high image quality by achieving an increase in the number of light sources and in the number of rotation of a rotating deflector such as a polygon scanner. If a rotating light deflector rotates at a higher speed for enhancing productivity of an image forming apparatus, the bearing of the rotating deflector generates heat. Therefore, there is a limit to an increase in rotation of a rotating light deflector. By contrast, it is known that an increase in the number of light sources achieves high productivity and high density in image forming apparatuses.

Some techniques have been disclosed to increase the number of light sources. For example, Japanese Patent No. JP-3681555-B (Japanese Patent Application Publication No. JP-2000-098278-A) discloses a technique in which multiple luminous fluxes intersect to be condensed on a rotating light deflector with a laser diode having a single light source. Japanese Patent No. JP-3451467-B (Japanese Patent Application Publication No. JP-H10-003047-A) discloses a technique in which light fluxes are synthesized so as to be arranged at given beam pitches after passing through a coupling lens. Further, Japanese Patent Application Publication No. JP-2009-294238-A discloses a technique of an optical scanner in which the number of parts is decreased by removing a holder to which a light source is attached, and the light source is easily replaceable and adjustable in its rotation direction after installation.

The techniques disclosed in JP-3681555-B (JP-2000-098278-A) and JP-3451467-B (JP-H10-003047-A) increase the size of each device when compared with a device in which a laser diode array having multiple light sources is provided in one package. Further, the laser diode array needs rotation adjustment and fixation to obtain a desired writing density. However, since the laser diode array is small, a separate holder is provided to hold the laser diode array. Therefore, the rotation of the laser diode array is adjusted with this holder. Accordingly, the number of parts increases, which makes it difficult to reduce the size of the optical scanner. Further, the technique disclosed in JP-2009-294238-A cannot enhance operability in adjustment of beam pitches for positioning and adjusting the rotation direction of the laser diode array.

SUMMARY

The present invention provides an optical scanner including a light source including a recessed portion provided on an outer circumference thereof, and a housing configured to support the light source. The housing includes a positioning unit configured to position the light source in a vertical optical axis of the light source and a cutout provided on an inner circumference of the positioning unit. The light source is positioned to the positioning unit with the recessed portion being disposed at the cutout and then is fixed to the housing.

Further, the present invention provides an image forming apparatus including an image carrier configured to form an image on a surface thereof, and the above-described optical scanner.

BRIEF DESCRIPTION OF THE DRAWINGS

A more complete appreciation of the invention and many of the advantages thereof will be obtained as the same becomes better understood by reference to the following detailed description when considered in connection with the accompanying drawings, wherein.

DETAILED DESCRIPTION

Figure 1:
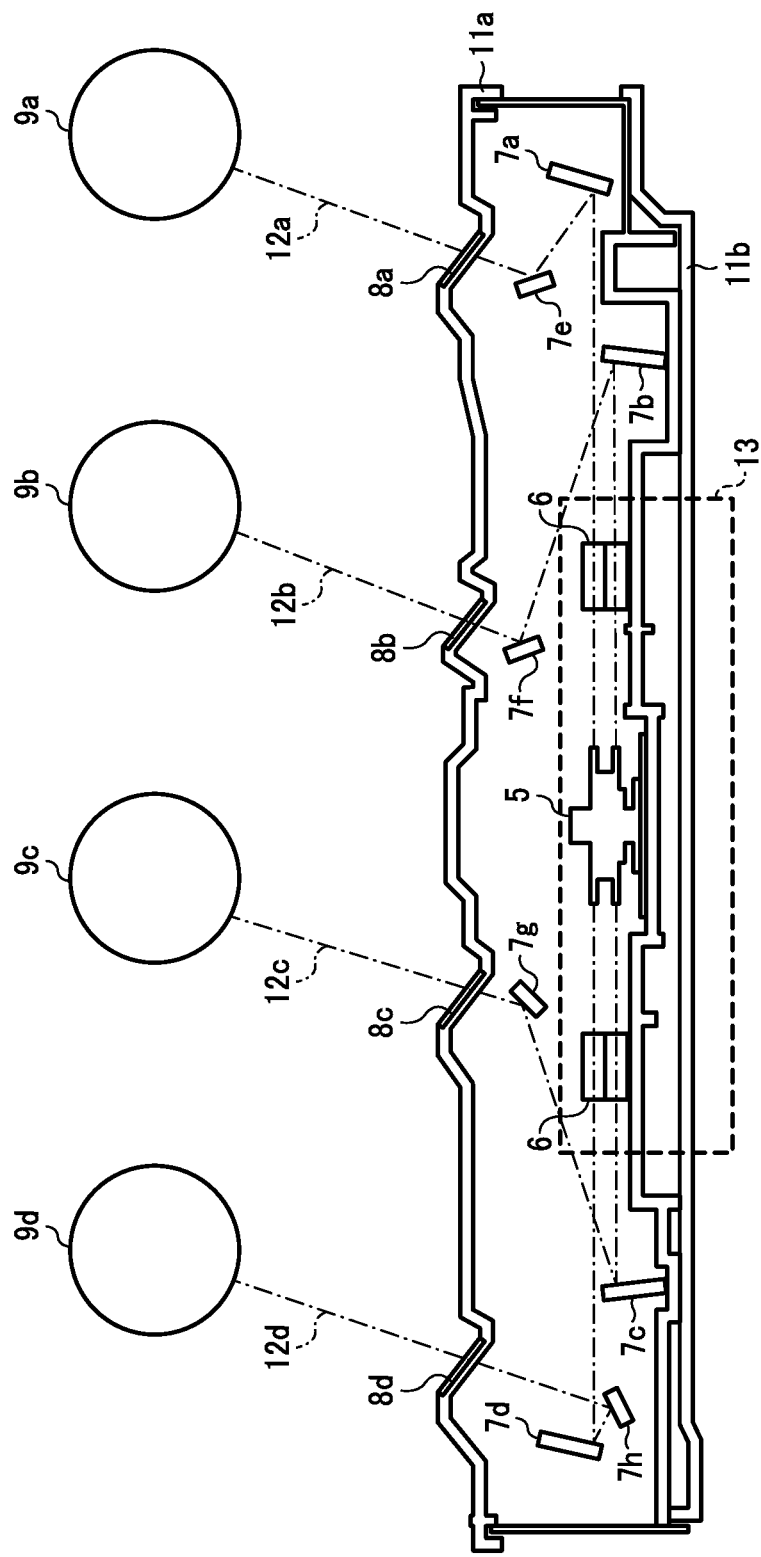
FIG. 1 is a schematic front view illustrating an optical scanner according to an embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

The terminology used herein is for describing particular embodiments and is not intended to be limiting of exemplary embodiments of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of the present invention. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of the present invention.

The present invention is applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of the present invention are described.

Figure 2:
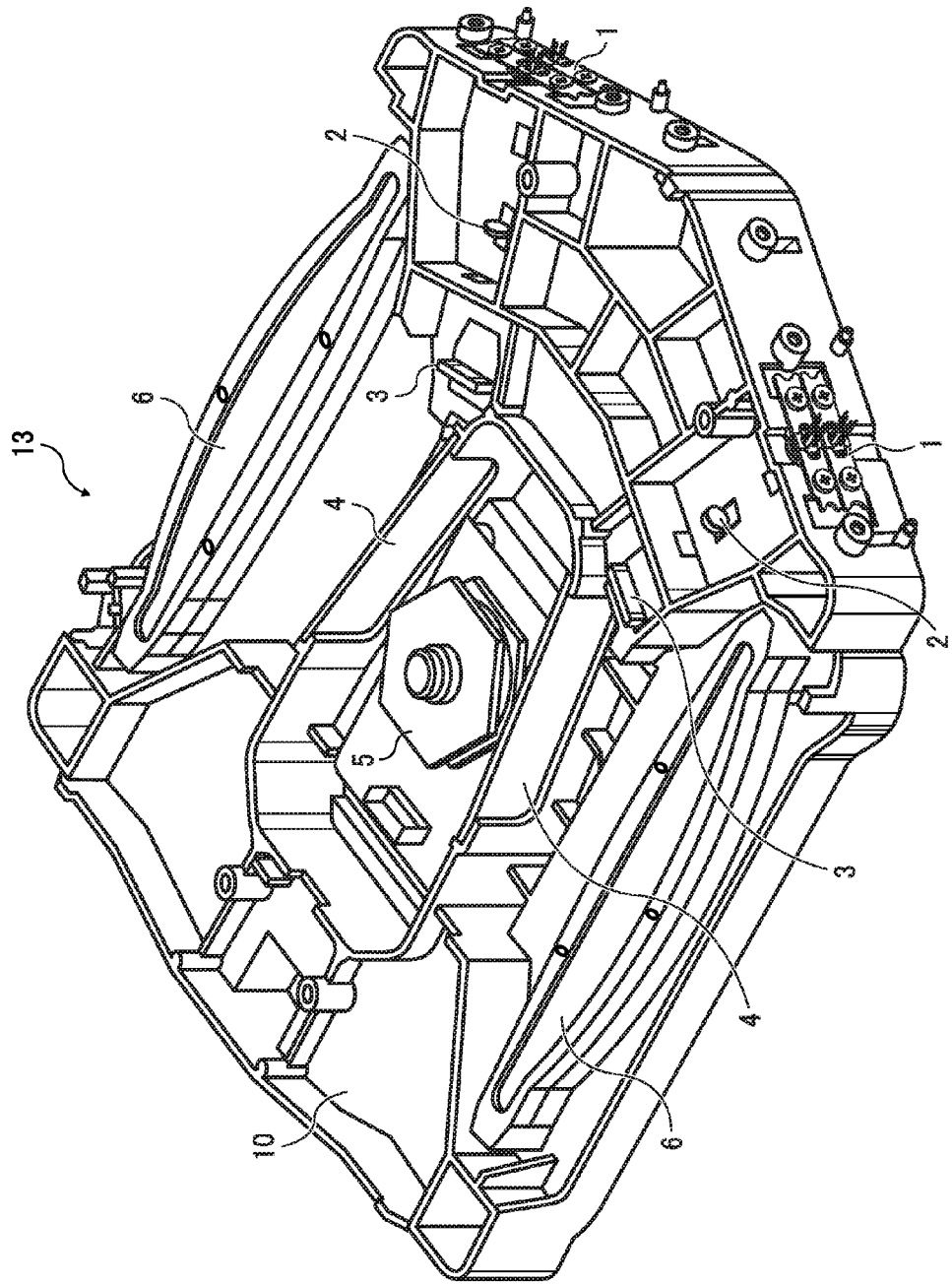
FIG. 2 is a schematic perspective view illustrating the optical scanner of FIG. 1.
Figure 13:
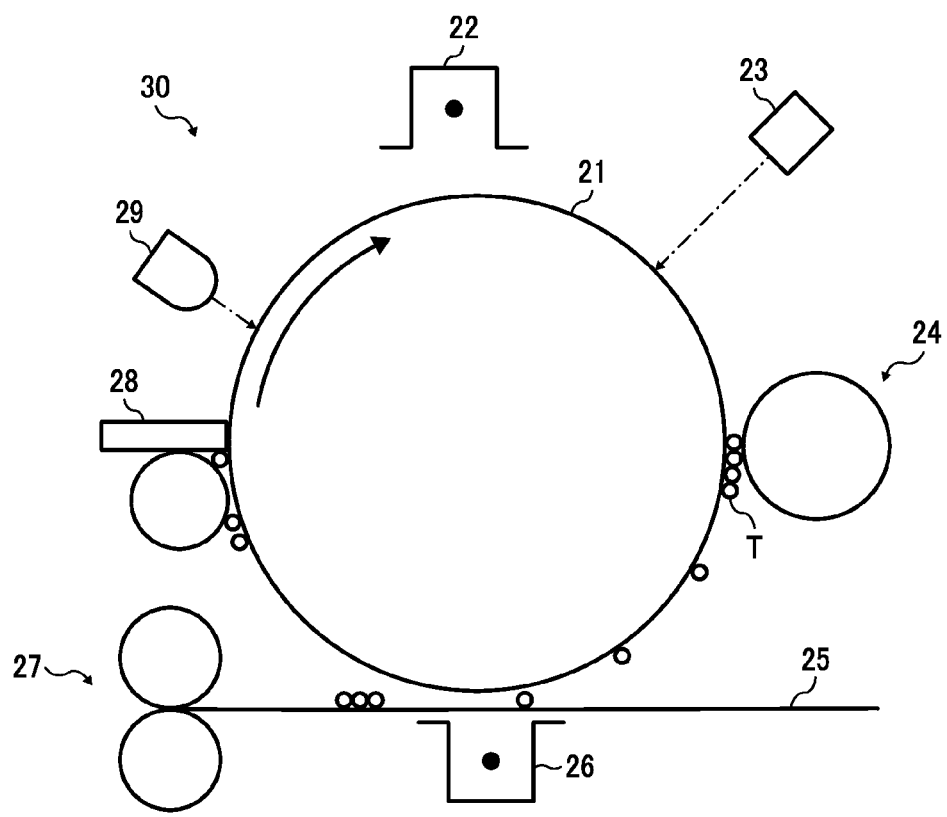
FIG. 13 is a schematic diagram of a main part of an image forming apparatus applicable to an embodiment of the present invention.

A description is given of an optical scanner 13 according to an embodiment, with reference to FIGS. 1 and 2. The optical scanner 13 is basically provided to an exposure unit (e.g., an exposure light source unit 23) of an image forming apparatus 30 as illustrated in FIG. 13).

As illustrated in FIGS. 1 and 2, the optical scanner 13 includes a housing 10 that accommodates light source mounting parts 1, coupling lenses 2, apertures, cylindrical lenses 3, soundproof grasses 4, a polygon scanner 5, and scanning lenses 6.

Each of the light source mounting parts 1 emits laser light. Each of the coupling lenses 2 converts the laser light emitted in a form of divergent light into parallel light. Each of the apertures shapes the parallel light into laser light having a desired form. Each of the cylindrical lenses 3 collects the laser light shaped by the aperture in a linear form. The soundproof grasses 4 seal or closely contact a setting part of the polygon scanner 5.

The polygon scanner 5 functions as a light deflector that includes reflection mirrors on respective side surfaces of a regular polygon. The polygon scanner 5 rotates at a high speed to deflect and scan laser light beams. The scanning lenses 6 have functions of fθ (f-theta) correction and optical face tangle error correction.

Further, mirrors 7a, 7b, 7c, 7d, 7e, 7f, 7g, and 7h, dustproof glasses 8a, 8b, 8c, and 8d, housing 10, an upper cover 11a, and a lower cover 11b are provided in the exposure unit (e.g., the exposure light source unit 23).

The mirrors 7a, 7b, 7c, 7d, 7e, 7f, 7g, and 7h guide the laser light beams to photoconductors 9a, 9b, 9c, and 9d on which respective images are formed. The dustproof glasses 8a, 8b, 8c, and 8d prevent dust falling into the housing 10. The upper cover 11a and the lower cover 11b seal the housing 10 hermetically.

Reference numerals 12a, 12b, 12c, and 12d in FIG. 1 indicate respective light pathways along which laser light travels from the light source mounting parts 1 to the photoconductors 9a, 9b, 9c, and 9d.

The coupling lenses 2 and the cylindrical lenses 3 are positioned and adjusted, and then fixed to the housing 10 with UV curing adhesive.

Figure 3:
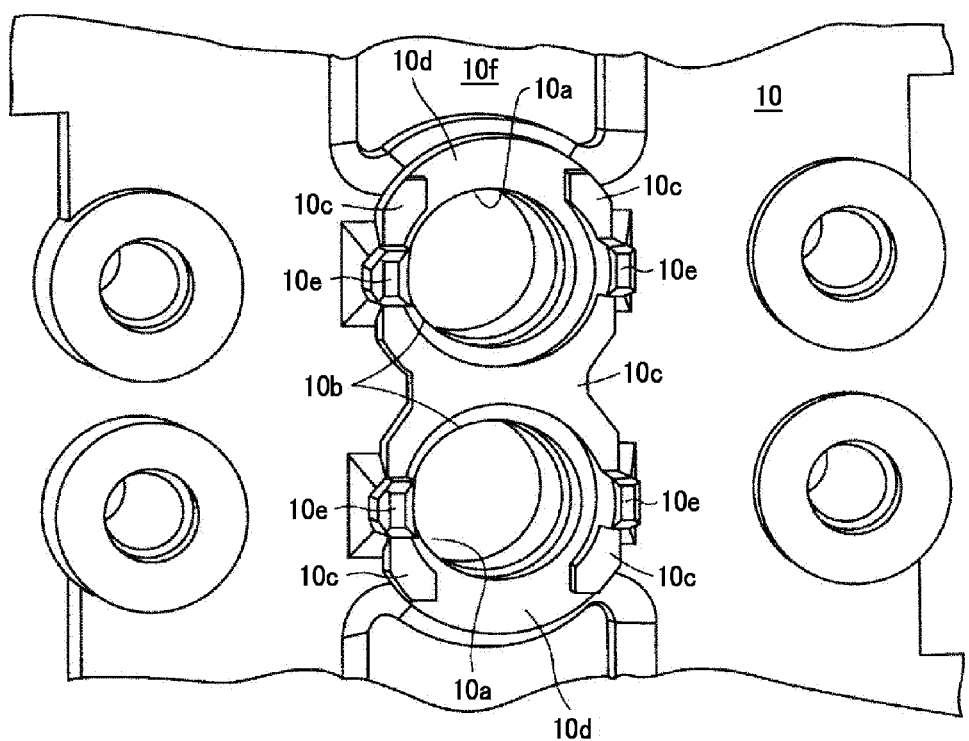
FIG. 3 is a schematic diagram illustrating a mounting structure of a light source mounting part in the optical scanner.
Figure 4:
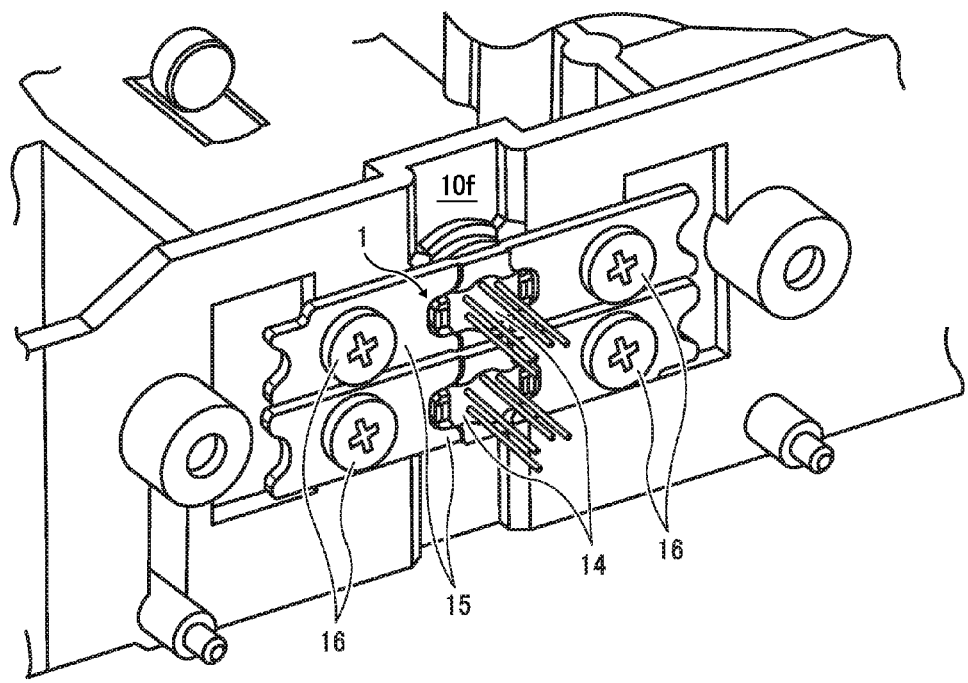
FIG. 4 is a schematic diagram illustrating the light source mounting part with laser diode arrays in a mounted state.

With reference to FIGS. 3 and 4, a description is given of the housing 10 of the optical scanner 13.

FIG. 3 illustrates a mounting structure of the light source mounting parts 1 in the housing 10 of the optical scanner 13. FIG. 4 illustrates the light source mounting parts 1 in the housing 10 with two laser diode arrays 14 in a mounted state.

Each light source mounting part 1 of the housing 10 includes two cylindrical mounting holes 10a arranged in a vertical direction. Each light source mounting part 1 includes two laser diode arrays 14 functioning as light sources as illustrated in FIG. 4. The mounting holes 10a are provided to mount and support the laser diode arrays 14 to the light source mounting part 1. A diameter of each mounting hole 10a is slightly greater than a diameter of the laser diode array 14. Each mounting hole 10a receives the laser diode array 14 to fit substantially exactly and rotate therein.

The housing 10 further includes mounting surfaces 10b, positioning units 10c, cutouts 10d, and guides 10e.

The mounting surfaces 10b are arranged around the mounting holes 10a. A flange that is attached to each laser diode array 14 abuts against the corresponding mounting surfaces 10b.

The positioning units 10c are disposed around the respective mounting surfaces 10b in a manner of projecting from the mounting surface 10b. The flange attached to the laser diode array 14 is substantially exactly fitted to each positioning unit 10c. Therewith, each positioning unit 10c has a diameter that tolerates rotation of each laser diode array 14.

The positioning units 10c include an upper side of the upper mounting hole 10a and a lower side of the lower mounting hole 10a. Both sides are parts of an inner circumference of the positioning units 10c and are arranged to have the same surface as the mounting surface 10b. The upper and lower sides are formed as the respective cutout 10d.

The guides 10e are disposed at the right direction (e.g., the 3 o'clock direction) and the left direction (e.g., the 9 o'clock direction) of each mounting hole 10a to guide the laser diode array 14 when fitting the flange of each laser diode array 14 to the positioning unit 10c.

Positional adjustment of the laser diode arrays 14 is performed by rotating the laser diode array 14 so that a desired beam pitch can be obtained on a target scanning surface and determining the rotation angle of the laser diode arrays 14. After the rotation angle of each laser diode array 14 has been determined, fixing members 15 press the laser diode array 14 from behind toward the housing 10 so as to attach and fix the laser diode arrays 14 to the housing 10 with screws 16. By so doing, as illustrated in FIG. 4, the laser diode arrays 14 are attached and fixed to the housing 10 by a pressing force exerted by each fixing member 15. In this mounted state of the laser diode arrays 14 to the housing 10, the pressing force exerted by each fixing member 15 works solely in an optical axial direction of the laser diode array 14 (refer to a reference symbol "A" in FIG. 8). Therefore, rotational variation after adjustment and fixture of the laser diode arrays 14 to the housing 10 is substantially small with respect to a desired beam pitch (e.g., 21.1 um, 42.3 um, and the like). Accordingly, images formed by the optical scanner 13 can maintain good image quality for a long time.

Figure 5:
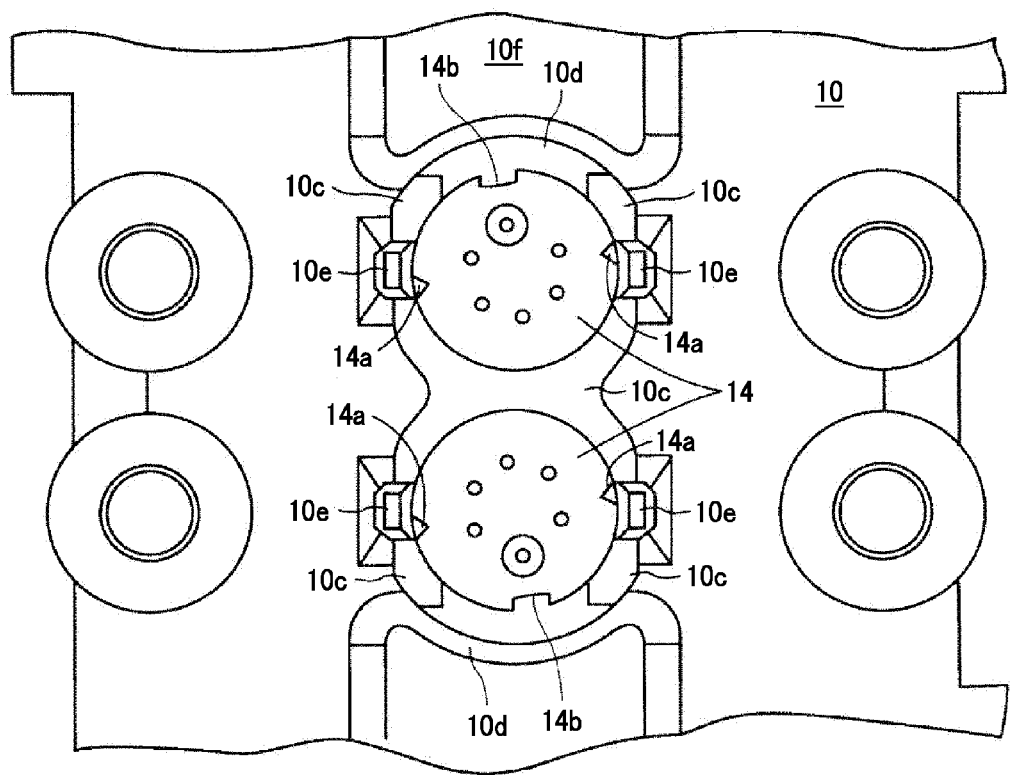
FIG. 5 is a schematic diagram illustrating the mounting structure of the light source mounting part with the laser diode arrays engaged therewith.

With reference to FIG. 5, a description is given of the laser diode arrays 14 attached to the housing 10.

FIG. 5 illustrates the mounting structure of the light source mounting part 1 with the laser diode arrays 14 fitted to the corresponding mounting hole 10a and the flange of the laser diode array 14 fitted to the corresponding positioning unit 10c. Each flange of the respective laser diode arrays 14 has two V-shaped gutters 14a disposed opposite to each other. A recessed portion 14b is arranged at the center portion between the V-shaped gutters 14a of each laser diode array 14. The recessed portion 14b has a flat bottom. Each laser diode array 14 is attached to the housing 10 so that the recessed portion 14b is positioned at the cutout 10d.

Figure 6:
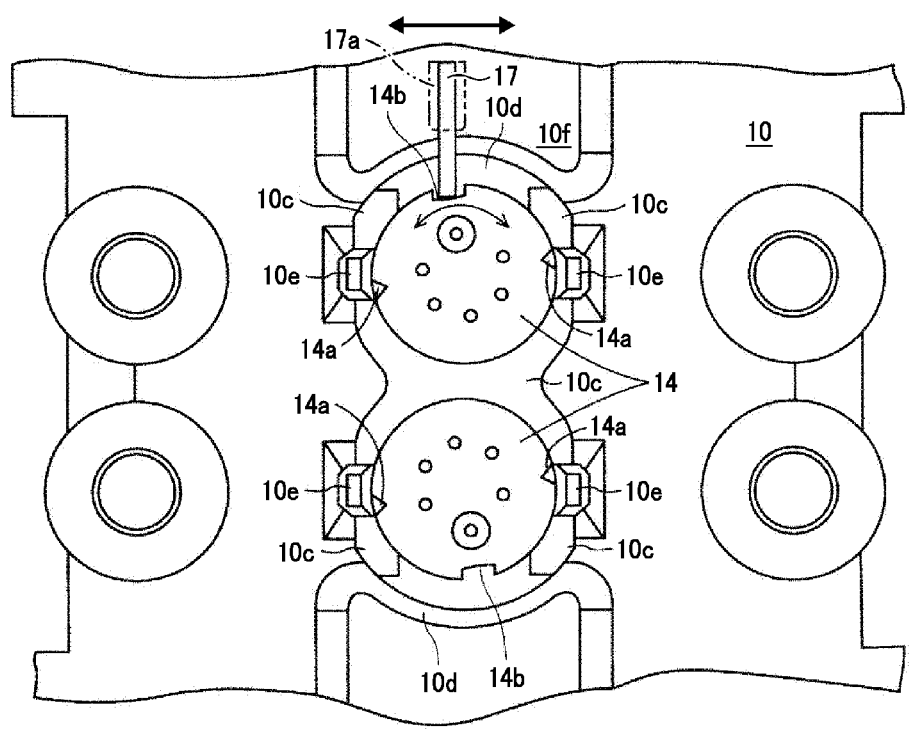
FIG. 6 is a schematic diagram illustrating the mounting structure of the light source mounting part with the laser diode arrays engaged therewith.
Figure 7:
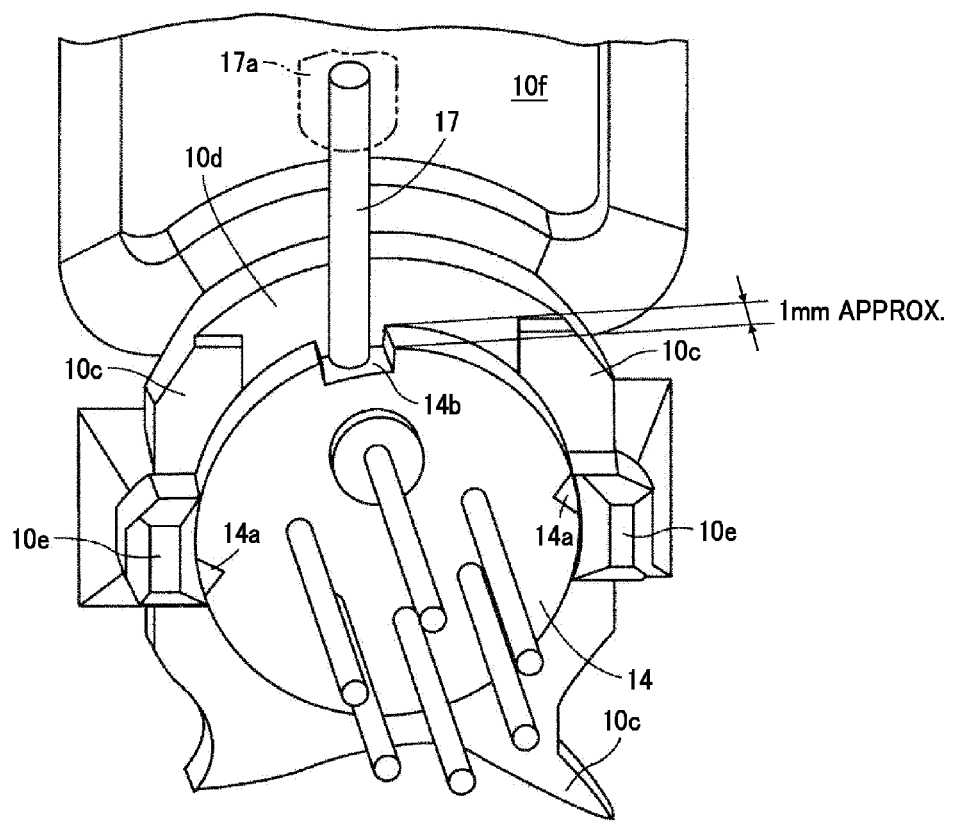
FIG. 7 is an enlarged schematic diagram illustrating the mounting structure and adjustment of the laser diode array engaged therewith.
Figure 8:
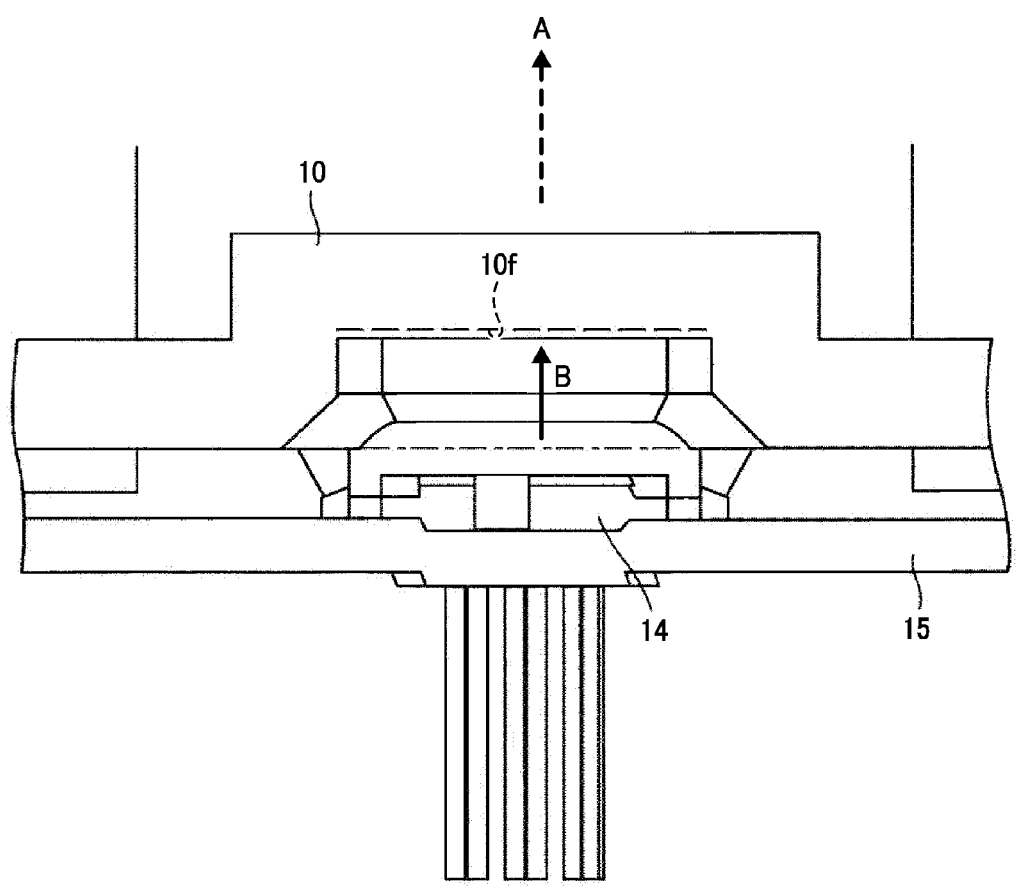
FIG. 8 is a schematic diagram illustrating the mounting structure of the light source mounting part and an inner wall of a housing of the optical scanner.

With reference to FIGS. 6 through 8, a description is given of the laser diode arrays 14 with a pin 17 inserted thereto.

FIG. 6 illustrates the mounting structure and adjustment of the laser diode arrays 14 engaged therewith. FIG. 7 illustrates the mounting structure and adjustment of the laser diode array 14 engaged therewith. FIG. 8 illustrates the mounting structure of the light source mounting part and an inner wall 10f of the housing 10 of the optical scanner 13.

Rotational adjustment of the laser diode arrays 14 is performed at the recessed portion 14b. As illustrated in FIG. 6, the pin 17 is inserted into the recessed portion 14b of the laser diode array 14 and moves in a horizontal direction or right and left directions. By so doing, the laser diode array 14 is rotated.

As illustrated in FIG. 7, the thickness of the flange of the laser diode array 14 is approximately 1 mm. To obtain rigidity of the pin 17, a diameter of the tip portion of the pin 17 to be joined to the whole recessed portion 14b is required to be equal to or smaller than 1 mm. However, the pin 17 has a pin body 17a that indicates a portion of the pin 17 other than the tip portion, and the diameter of the pin body 17a can be greater than 1 mm. Therefore, as illustrated in FIGS. 3 and 4, the inner wall 10f that stands behind the cutout 10d of the housing 10 has a width greater than the width of the cutout 10d. In addition, the inner wall 10f has a depth from the surface of the housing 10 toward the inward side of the optical scanner 13 equal to the thickness thereof.

FIG. 8 illustrates the mounting structure of the light source mounting part 1 and the inner wall 10f seen from thereabove. The inner wall 10f of the housing 10 is recessed toward an inside of the optical scanner 13 in a direction indicated by a solid arrow B illustrated in FIG. 8, which is a same direction as the optical axial direction A (indicated by a dashed arrow) in which the luminous flux is emitted. Providing the depth of the inner wall 10f to be same as the thickness thereof prevents the housing 10 from having uneven wall thickness. As a result, this prevents the event that the stability of molding (the flowability of resin) is impaired.

Figure 9:
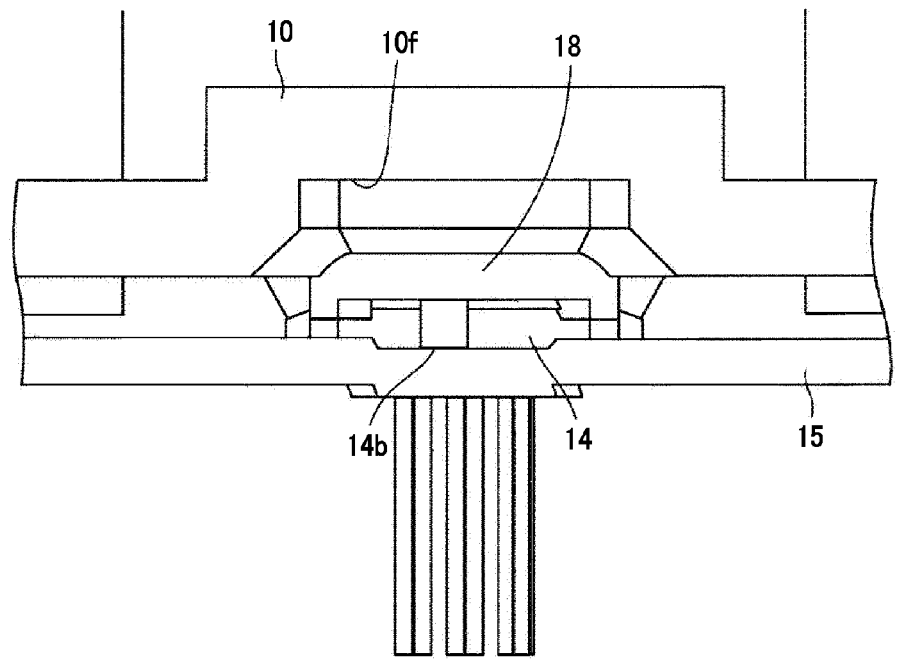
FIG. 9 is a schematic diagram illustrating the mounting structure of the light source mounting part and an exposed recess of a flange of each laser diode array.

FIG. 9 illustrates the mounting structure of the light source mounting part 1 and an exposed recess of the flange of each laser diode array 14.

As illustrated in FIG. 9, the laser diode array 14 is formed to expose the recessed portion 14b so that a pin such as the pin 17 and an eccentric pin 18 can be inserted into the recessed portion 14b even after the laser diode array 14 is fixed to the housing 10 with the fixing member 15.

Figure 10:
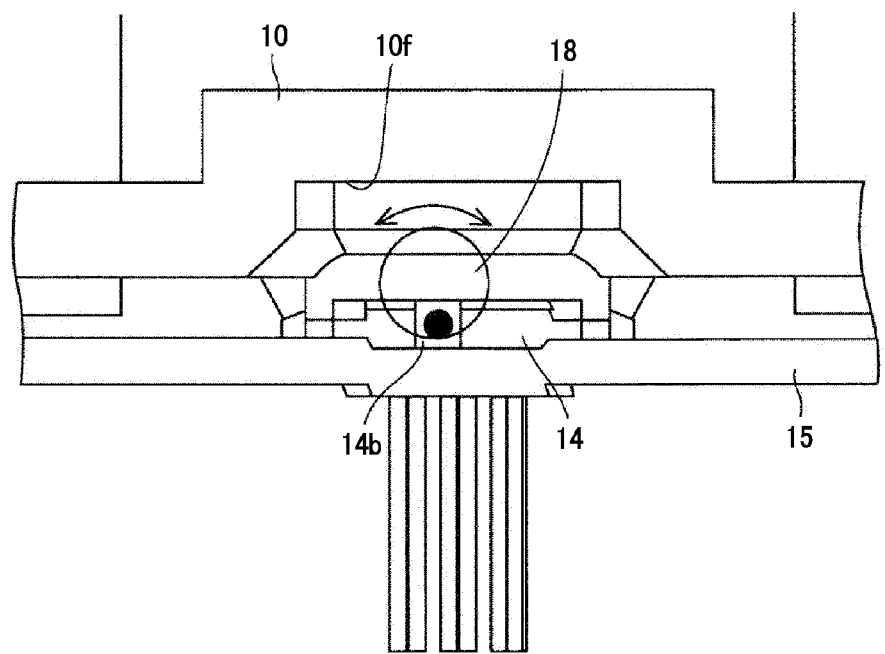
FIG. 10 is a schematic diagram illustrating the mounting structure and adjustment of the laser diode array with a pin.

By combining the structures shown in FIGS. 8 and 9, the eccentric pin 18 that has a diameter greater than the diameter of the pin 17 can be used as illustrated in FIG. 10. FIG. 10 illustrates the mounting structure and adjustment of the laser diode array 14 with the eccentric pin 18. As illustrated in FIG. 10, the eccentric pin 18 can move in the right and left directions in a designated area.

Figure 11:
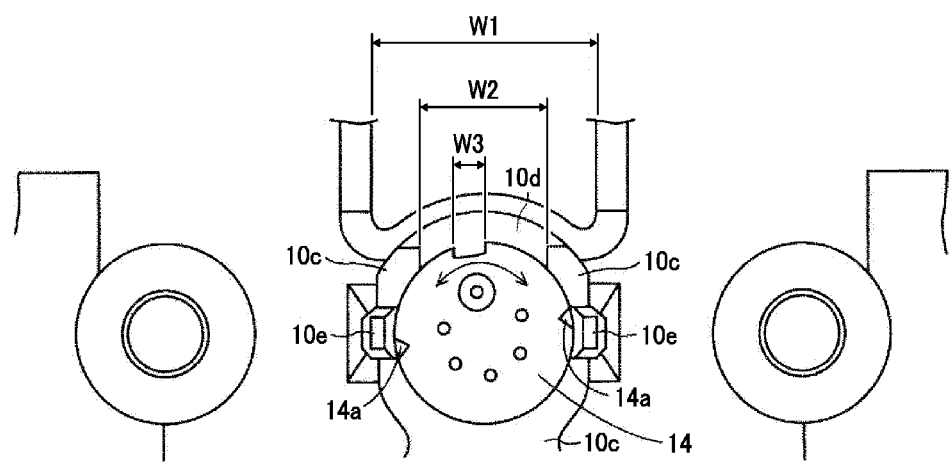
FIG. 11 is a schematic diagram illustrating adjustment of the light source mounting part and respective widths of members related to the adjustment.

Further, FIG. 11 illustrates adjustment of the laser diode array 14 and respective widths of members related to the adjustment.

A width W1 of the recessed portion 14b is determined after due consideration of amount of movement of the eccentric pin 18. The relation of the width W1 of the recessed portion 14b, a width W2 of the cutout 10d, and a width W3 of the positioning number 10c is described below and shown in FIG. 11:

Width W1 of the recessed portion 14b<Width W2 of the cutout 10d<Width W3 of the positioning unit 10c.

In the present embodiment, two laser diode arrays 14 are provided to each light source mounting part 1 and are arranged in a vertical direction thereof. The laser diode arrays 14 are so arranged because the laser diode arrays 14 arranged in the vertical direction form respective electrostatic latent images having different colors to each other. An integrated circuit substrate is employed for the laser diode arrays 14. Except for the position of the laser diode arrays 14 arranged in the vertical direction, a configuration of a front side optical system to the polygon scanner 5 and a configuration of an fθ (f-theta) lens through which deflected luminous fluxes pass are identical, as illustrated in FIG. 1. Since the angle of incidence to the polygon scanner 5 is identical to each laser diode array 14, the laser diode arrays 14 share an identical scope or valid range on the mirror of the polygon scanner 5. Accordingly, the polygon scanner 5 can increase an angle of view. When two laser diode arrays 14 are arranged in the vertical direction, the lower laser diode array 14 is disposed to have access to the recessed portion 14b from the lower part of the housing 10. Specifically, as illustrated in FIG. 5, a bottom surface of the recessed portion 14b of the lower laser diode array 14 is arranged to face a bottom surface of the recessed portion 14b of the upper laser diode array 14 in parallel to each other.

The upper and lower laser diode arrays 14 can be adjusted in the same manner. The luminous fluxes emitted from the respective laser diode arrays 14 pass through the fθ lens from the front side optical system to the polygon scanner 5. The position of each luminous flux is measured by a CCD (charge-coupled device) camera or the like on a target scanning surface. Based on the measurement results, the laser diode array 14 is rotated with the eccentric pin 18 to adjust and obtain a desired beam pitch while reviewing the measurement results through the CCD camera. During adjustment, the screws 16 are loosened until the laser diode arrays 14 can rotate. After the adjustment, the laser diode arrays 14 are sufficiently fixed with the screws 16 to the housing 10. The above-described adjustment and tool configuration is an example and the configuration of the optical scanner 13 according to the present embodiment is not limited thereto.

When using known adjustment methods, if the recessed portion 14b is not used for adjustment of the laser diode arrays 14, rotating a socket that is connected to the laser diode array 14 for lighting can rotate the laser diode array 14 solely or together with the fixing member 15. However, when the laser diode array 14 is rotated solely, the rotation force of the laser diode array 14 is exerted to a power supply unit of the laser diode array 14. In this case, it is likely to cause failure in power supply due to poor connection. Further, when the laser diode array 14 is rotated together with the fixing member 15, if the laser diode arrays 14 are arranged in the vertical direction as described in the present embodiment, the fixing members 15 contact with each other. In this case, it is likely to hinder adjustment of rotation of the laser diode arrays 14.

By contrast, in the adjustment by rotating the laser diode arrays 14 described in the present embodiment, the rotation force of the laser diode array 14 is exerted to the flange of each laser diode array 14. Therefore, the above-described failures may not occur. The adjustment according to the present embodiment can enhance productivity of the optical scanner 13 by improvement of yield rate compared to the above-described known adjustment methods.

As described above, the present embodiment provides a configuration in which, even if the laser diode arrays 14 included in the light source mounting parts 1 are attached to the housing 10, the respective recessed portions 14b of the laser diode arrays 14 can contact a jig or tool so as to adjust with rotation of the laser diode arrays 14 easily. Further, since the minimum number of jig parts, which are the fixing members 15 and screws 16, is required for this adjustment, the optical scanner 13 according to the present embodiment can achieve a reduction in size thereof.

Figure 12:
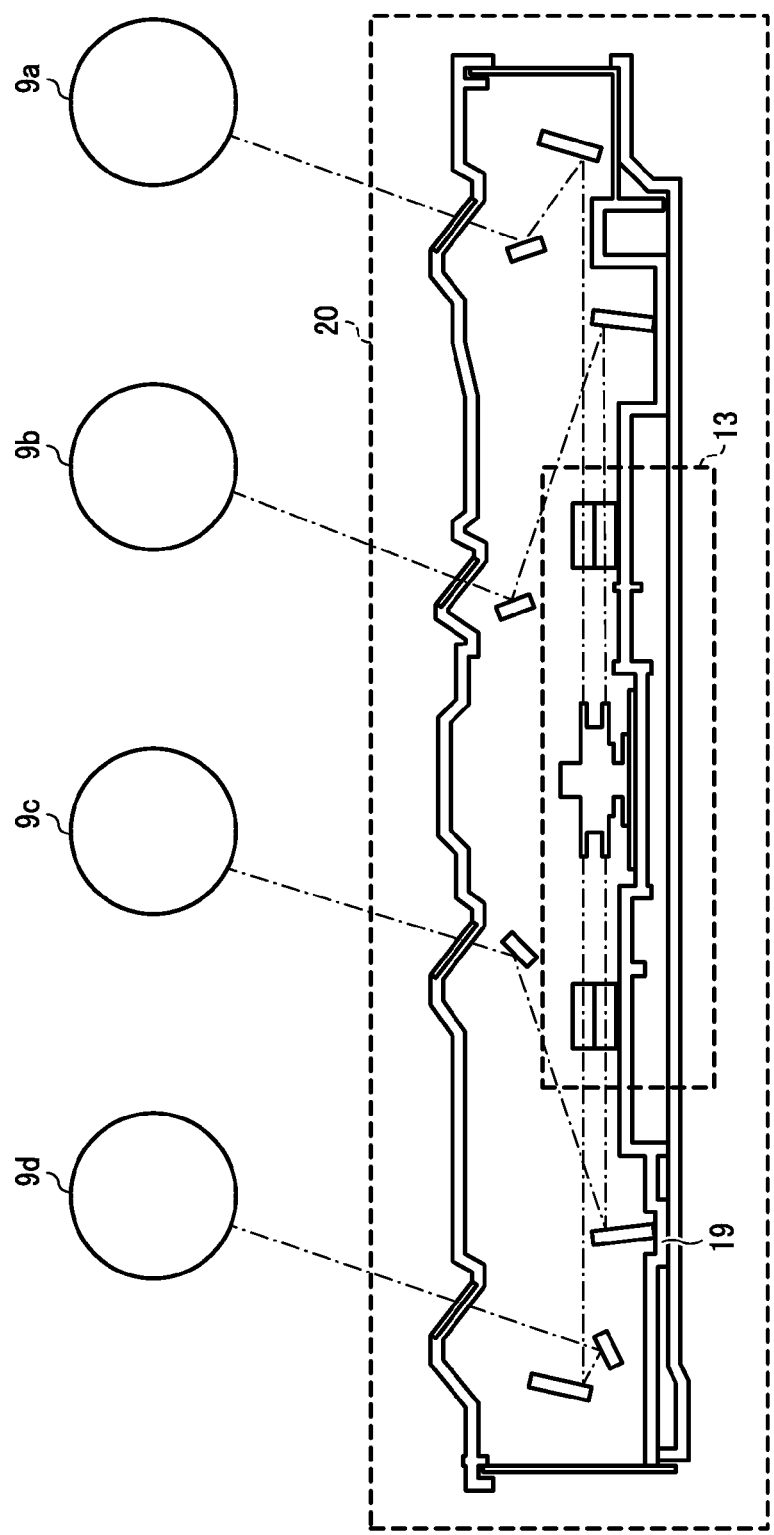
FIG. 12 is a schematic diagram illustrating another housing of a second optical scanner according to another embodiment.

Now, FIG. 12 is a schematic diagram illustrating a second optical scanner 20 having a second housing 19.

The optical scanner 13 shown in FIG. 2 has a configuration in which the laser light is conveyed along the light pathways from the laser source mounting parts 1 to the scanning lenses 6. Thereafter, the light pathways may need to be bent to reflect and convey the laser light to the photoconductors 9a, 9b, 9c, and 9d, as illustrated in FIG. 1.

Therefore, as illustrated in FIG. 12, the second housing 19 is provided as another housing that includes bend mirrors and the optical scanner 13. Further, a second optical scanner 20 is provided with the second housing 19 incorporating the bend mirrors and the optical scanner 13 to guide the laser light to the photoconductors 9a, 9b, 9c, and 9d. With this configuration, the beam pitch adjustment can be performed in the optical scanner 13. As a result, the size of adjustment jigs and tools is reduced, which can contribute to a reduction in cost.

With reference to FIG. 13, an overview of electrophotographic processes is described.

FIG. 13 illustrates a schematic configuration of the image forming apparatus 30.

The image forming apparatus 30 performs electrophotographic image forming processes, which specifically are a charging process, an exposure process, a development process, a transfer process, a cleaning process, and a fixing process. In the charging process, a charger 22 uniformly charges a surface of a photoconductive image carrier 21 in a dark part of an image forming apparatus 30. In the exposure process, the exposure light source unit 23 functioning as an optical exposure unit that emits light (e.g., the laser light travels along the light pathway 12) to the charged parts on the surface of the photoconductive image carrier 21. With this operation, electric charge on the charged parts is removed to form an electrostatic latent image. Current digital image forming apparatuses commonly use a negative process. In the development process, a development unit 24 supplies toner T that is fine particle charged to an opposite polarity to the electrostatic latent image and causes the toner to electrostatically adhere to the electrostatic latent image. With this operation, the electrostatic latent image is developed to a toner image. In the transfer process, the toner image is overlaid on a recording sheet 25 functioning as a recording medium, and a transfer charger 26 that is disposed on the back of the recording sheet 25 applies electric charge having an opposite polarity to the toner charge polarity to the recording sheet 25. With this operation, the toner image is transferred onto the recording sheet 25 electrostatically. In the cleaning process, a cleaner such as a cleaning blade 28 and a magnetic brush removes residual toner remaining on the surface of the photoconductive image carrier 21. After the residual toner is removed by the cleaner, a discharging light source unit 29 discharges residual electric charge remaining on the surface of the photoconductive image carrier 21. In the fixing process, the recording sheet is conveyed to a fixing unit including a heat roller and a pressure roller. Due to application of heat and pressure in the fixing unit, the toner image attached to the recording sheet is fixed to the recording sheet. In the fixing process, the toner T is fixed mainly to a paper such as the recording sheet 25. However, the fixing process can be done to fix the toner T to high polymeric material such as OHP (overhead projector) sheets. The image forming apparatus 30 illustrated in FIG. 13 is an example image forming apparatus that performs the above-described electrophotographic image forming processes.

The image forming apparatus 30 may be a copier, a printer, a plotter, a facsimile machine, a multifunction peripheral or a multifunction printer (MFP) having at least one of copying, printing, scanning, facsimile, and plotter functions, or the like. According to the present embodiment, the image forming apparatus 30 is an electrophotographic copier that forms toner images on recording media by electrophotography.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An optical scanner comprising:
   a light source including a recessed portion provided on an outer circumference thereof; and
   a housing configured to support the light source, the housing including:
      a positioning unit configured to position the light source in a vertical optical axis of the light source; and a cutout provided on an inner circumference of the positioning unit, wherein the light source is positioned on the positioning unit with the recessed portion being disposed at the cutout and then fixed to the housing, wherein the housing includes an inner wall that stands at a position behind the cutout toward an inside of the housing in an optical axial direction of the light source, and wherein the inner wall has a width greater than the width of the cutout.

2. The optical scanner according to claim 1, wherein the cutout has a width greater than a width of the recessed portion.

3. The optical scanner according to claim 1, wherein the housing is fixed to a second housing that holds a mirror to reflect the laser light emitted by the light source.

4. An image forming apparatus comprising:
an image carrier configured to form an image on a surface thereof; and
the optical scanner according to claim 1.

5. An optical scanner comprising:
a light source including a recessed portion provided on an outer circumference thereof; and
a housing configured to support the light source, the housing including:
a positioning unit configured to position the light source in a vertical optical axis of the light source; and
a cutout provided on an inner circumference of the positioning unit, wherein the light source is positioned on the positioning unit with the recessed portion being disposed at the cutout and then fixed to the housing, wherein the housing includes an inner wall that stands at a position behind the cutout toward an inside of the housing in an optical axial direction of the light source, and wherein the inner wall has a depth from the surface of the housing toward the inward side of the housing equal to a thickness thereof.

6. The optical scanner according to claim 5, wherein the cutout has a width greater than a width of the recessed portion.

7. The optical scanner according to claim 5, wherein the housing is fixed to a second housing that holds a mirror to reflect the laser light emitted by the light source.

8. An image forming apparatus comprising:
an image carrier configured to form an image on a surface thereof; and
the optical scanner according to claim 5.

9. An optical scanner comprising:
a light source including a recessed portion provided on an outer circumference thereof; and
a housing configured to support the light source, the housing including:
a positioning unit configured to position the light source in a vertical optical axis of the light source; and
a cutout provided on an inner circumference of the positioning unit, wherein the light source is positioned on the positioning unit with the recessed portion being disposed at the cutout and then fixed to the housing, and wherein the recessed portion is exposed outside in the state that the light source is fixed to the housing.

10. The optical scanner according to claim 9, wherein the housing includes an inner wall that stands at a position behind the cutout toward an inside of the housing in an optical axial direction of the light source.

11. The optical scanner according to claim 9, wherein the cutout has a width greater than a width of the recessed portion.

12. The optical scanner according to claim 9, wherein the housing is fixed to a second housing that holds a mirror to reflect the laser light emitted by the light source.

13. An image forming apparatus comprising:
an image carrier configured to form an image on a surface thereof; and
the optical scanner according to claim 9.

14. An optical scanner comprising:
a light source including a recessed portion provided on an outer circumference thereof;
a housing configured to support the light source, the housing including:
a positioning unit configured to position the light source in a vertical optical axis of the light source;
a cutout provided on an inner circumference of the positioning unit,
wherein the light source is positioned on the positioning unit with the recessed portion being disposed at the cutout and then fixed to the housing; and
a light deflector to deflect laser light,
wherein the light source includes two light sources arranged in a vertical direction and positioned at respective locations to have an identical luminous flux incident angle toward the light deflector, and
wherein the light sources are disposed to arrange respective bottom surfaces of the recessed portions of the light sources facing each other.

15. The optical scanner according to claim 14, wherein the cutout has a width greater than a width of the recessed portion.

16. The optical scanner according to claim 14, wherein the housing includes an inner wall that stands at a position behind the cutout toward an inside of the housing in an optical axial direction of the light source.

17. The optical scanner according to claim 14, wherein the housing is fixed to a second housing that holds a mirror to reflect the laser light emitted by the light source.

18. An image forming apparatus comprising:
an image carrier configured to form an image on a surface thereof; and
the optical scanner according to claim 14.

* * * * *